Dec. 10, 1963 H. BUSCH ETAL 3,114,027
HYDRAULIC TEMPERATURE SENSING DEVICES
FOR ELECTRIC HEATING APPLIANCES
Filed March 5, 1962 2 Sheets-Sheet 1
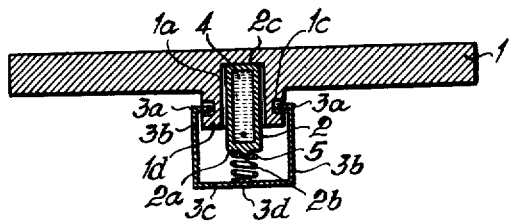
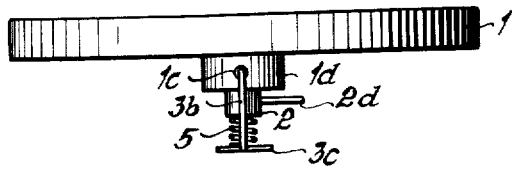
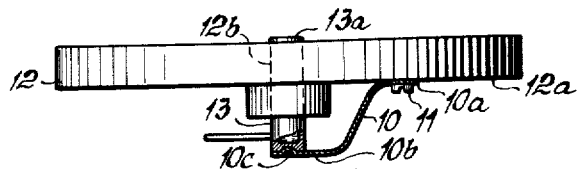
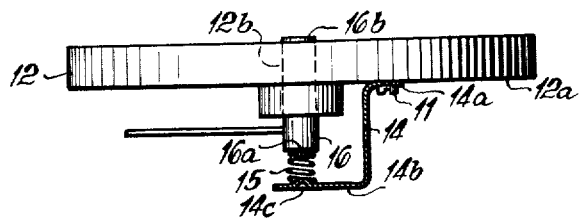
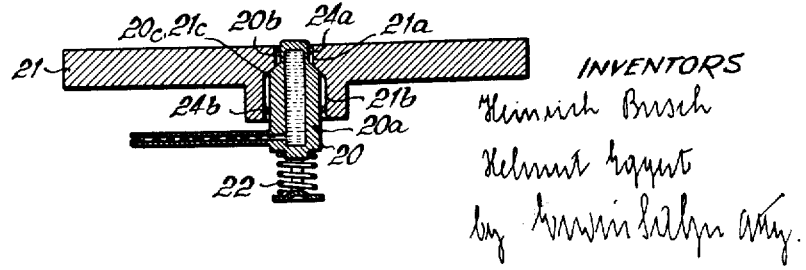
INVENTORS
Heinrich Busch
Helmut Eggert
by [signature] Atty.

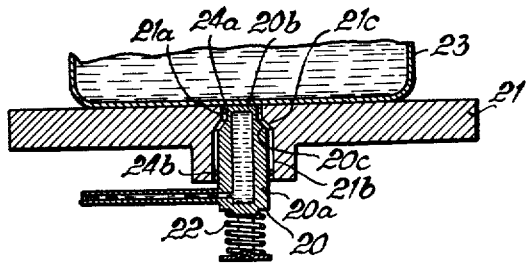
FIG. 6
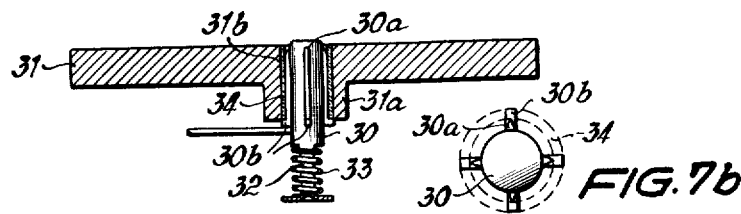
FIG. 7a
FIG. 7b
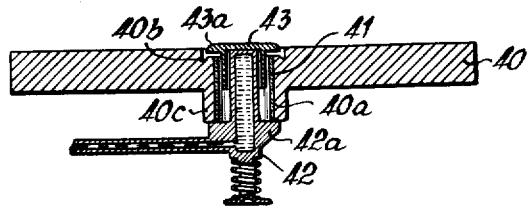
FIG. 8
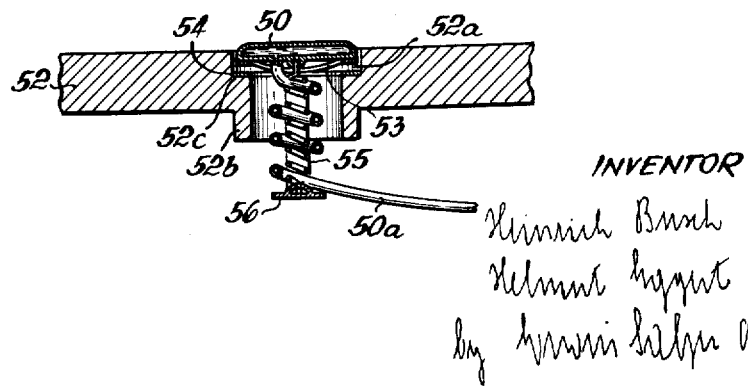
FIG. 9

United States Patent Office 3,114,027
Patented Dec. 10, 1963

3,114,027
HYDRAULIC TEMPERATURE SENSING DEVICES FOR ELECTRIC HEATING APPLIANCES
Heinrich Busch and Helmut Eggert, Ludenscheid, Germany, assignors to Busch-Jaeger Dürener Metallwerke Aktiengesellschaft, Ludenscheid, Germany
Filed Mar. 5, 1962, Ser. No. 177,943
Claims priority, application Germany Mar. 11, 1961
13 Claims. (Cl. 219—37)

This invention relates to electric cooking appliances, or cooking plates, and more particularly to such appliances or plates having hydraulic temperature sensing means and means for controlling the heating circuit.

Hydraulic sensing elements for electric cooking appliances comprise a liquid-filled receptacle arranged at the point where heat is generated and cooking performed, which receptacle is connected by a pipe line to a liquid-filled sensing element arranged more or less remote from the above point at another point where the means for controlling the heating circuit are located.

The present invention is more particularly concerned with the arrangement of parts of a hydraulic heat-sensing and circuit control system at the point where heat is generated and cooking performed or, in other words, at the heated plate member of an electric cooking appliance.

It is a general object of this invention to provide improved hydraulic heat sensing means integral with the heated plate member of an electric cooking appliance.

It is another object of this invention to provide means of the aforementioned description which are inexpensive to manufacture, rugged in use, precise, and which may readily be assembled and disassembled.

It is another object of this invention to provide a basic sensing structure which can be adapted by small changes to give either an indication of the temperatures prevailing at the surface of a cooking plate, or an indication of the temperature prevailing at the bottom of a pot or cooking vessel placed upon an electric cooking plate.

Still another object of the invention is to provide temperature sensing means whose indications depend substantially on the temperature prevailing at a given point of the plate member, and whose indications are hardly influenced by the temperature prevailing at other points of the plate member.

A further object of the invention is to provide hydraulic temperature sensing means which are effectively thermally insulated from all portions of a cooking plate except the upper surface thereof, or the bottom of a pot or cooking vessel placed upon the upper surface of the plate.

Further objects and advantages of the invention will become apparent as the following description proceeds, and the features of novelty which characterize the invention will be pointed out with particularity in the claims annexed to, and forming part of, this specification.

For a better understanding of the invention reference may be had to the accompanying drawings which illustrate several embodiments of the invention and wherein:

FIG. 1 is a vertical section through a first cooking appliance embodying the present invention;

FIG. 2 is a side elevation of the structure shown in FIG. 1;

FIG. 3 is an elevation of another appliance embodying the present invention;

FIG. 4 is an elevation of a modification of the structure shown in FIG. 3;

FIG. 5 is a vertical section through another embodiment of the present invention;

FIG. 6 is a vertical section through the same structure as shown in FIG. 5 in a slightly different position of its constituent parts and with a liquid-filled pot thereon;

FIG. 7a is a vertical section through still another embodiment of the invention;

FIG. 7b shows a detail of the structure of FIG. 7a in plan view and on a larger scale than FIG. 7a;

FIG. 8 is a vertical section through another cooking appliance embodying this invention; and FIG. 9 is partly a vertical section and partly an elevation of a further cooking appliance embodying the present invention.

Referring now to the drawings, and more particularly FIGS. 1 and 2 thereof, reference numeral 1 has been applied to indicate a plate member adapted to be heated electrically and having an upper surface and a lower surface and defining a recess 1a extending from said lower surface toward said upper surface. The means for electrically heating plate member 1 have not been shown in FIGS. 1 and 2. Conventional windings of resistance wires inserted into an electric circuit will serve that purpose. In the embodiment of the invention shown in FIGS. 1 and 2 recess 1a forms a dead-end passage but, if desired, it may also form a passage open at both ends, i.e. the upper end and the lower end as will be shown below more in detail. The upper end of passage or recess 1a should be closed if it is intended to sense the temperature of the heating surface of plate member 1 and should be open if it is intended to sense the temperature of a vessel placed upon the surface of plate member 1. Receptacle 2 is fitted into recess 1a in such a way as to leave a predetermined clearance between the lateral boundary wall of recess 1a and the lateral wall of receptacle 2. The top end of receptacle 2 is in abutting engagement with the dead-end of recess 1a. Receptacle 2 is filled with a body of liquid 4, and a capillary tube 2c is connected to receptacle 2 for indicating at points remote from receptacle 2 the relative expansion and contraction of the body of liquid 4 therein when subjected to increasing and decreasing temperatures. U-shaped bracket 3b, 3c on the lower surface of plate member 1 is arranged underneath recess 1a and supported by plate member 1. To this end plate member 1 is provided with a cylindrical projection 1d having a pair of horizontal holes 1c into which the bent upper ends 3a of the flange portions 3b of bracket 3b, 3c project. It will be noted that the width of the aforementioned flange portions 3b is considerably less than the width of the web portion 3c of bracket 3b, 3c. Due to the small width of flange portions 3b the upper bent ends 3a thereof inserted into holes 1c form effective pivots for bracket 3b, 3c. The bottom of receptacle 2 is provided with a projection 2b aligned with a like projection 3d formed in web portion 3c of bracket 3b, 3c. Compression spring 5 is interposed between receptacle 2 and bracket 3b, 3c and imparts to the former a bias in a direction longitudinally of recess 1a. Projections 2b, 3d project into helical compression spring 5 and maintain the same in position relative to parts 2 and 3b, 3c. Due to the action of spring 5 the top end of receptacle 2 engages under pressure the dead-end of recess 1a, thus achieving an effective thermal exchange (heat flow) at these particular points of plate member 1 and receptacle 2. Because of the lateral clearance between receptacle 2 and recess 1a the lateral heat exchange or transverse heat flow is relatively small, or minimized.

When assembling the structure of FIGS. 1 and 2, the trunnion ends 3a of bracket 3b, 3c are inserted into holes 1c while maintaining bracket 3b, 3c in a position at right angles to the position thereof shown in FIGS. 1 and 2. This makes it possible to thereafter readily insert receptacle 2 into recess 1a. Thereupon bracket 3b, 3c is turned 90 degrees into the position thereof shown in FIGS. 1 and 2 and spring 5 is interposed between parts 2 and 3b, 3c, thus causing a firm engagement between the top of receptacle 2 and the dead-end of recess 1a.

As an alternative to the above described pivotal support of bracket 3b, 3c, the flange portions 3b thereof might also be screwed against the projection 1d of plate member 1, yet the pivotable arrangement of parts shown in FIGS. 1 and 2 is preferred over this modification thereof.

The structures shown in FIGS. 3–9 have many common features with the structure of FIGS. 1 and 2 and, therefore, the former will only be described in considerable detail inasmuch as they differ significantly from that of FIGS. 1 and 2.

Referring now to FIG. 3 plate member 12 is adapted to be heated electrically. It has an upper surface and a lower surface 12a and defines a passageway 12b extending from the lower surface 12a to the upper surface and having an open upper end and an open lower end. The geometry of such a passageway will be described in greater detail with reference to some other figures such as, for instance, FIGS. 5 and 6. In FIG. 3 reference numeral 10 has been applied to indicate a Z-shaped bracket made of a resilient material. The right arm 10a of bracket 10 is screwed at 11 against the lower surface of plate member 12, whereas the left arm 10b of bracket 10 is provided with a projection 10c engaging a like recess in the bottom of liquid-filled receptacle 13. Under the spring action of bracket 10 the upper end 13a of receptacle 13 projects slightly above the level of the upper plane or top surface of plate member 1. Receptacle 13 is normally maintained in that position by the action of cooperating abutment means not shown in FIG. 3. These abutment means will be described in detail in connection with other figures as, for instance, FIGS. 5 and 6, wherein they are shown.

Referring now to FIG. 4 the structure shown therein is substantially the same as that shown in FIG. 3, except for the addition of a helical spring 15 interposed between a Z-shaped bracket 14 and fluid-filled receptacle 16. The latter is slidably arranged in a passageway 12b open at both ends thereof. The upper end 16b of receptacle 16 projects slightly beyond the upper surface of plate 12 and can be pressed downward against the bias of spring 15 so as to lie flush with that surface. The lower end of receptacle 16 has a projection 16a and the left arm 14b of Z-shaped bracket 14 has a projection 14c each engaging one of the ends of helical spring 15 and maintaining the latter in axial alignment with respect to receptacle 16. The right arm 14a of Z-shaped bracket 14 is screwed at 11 against the lower surface 12a of plate member 12.

The cost of manufacturing structures of the types shown in FIGS. 3 and 4 is slightly less than that of manufacturing structures of the type shown in FIGS. 1 and 2. The former also offer the advantage that arms 10b and 14b, respectively, may be readily moved in a plane parallel to the general plane of plate 12 when screw 11 is not tightened or as long as screw 11 is relatively loose.

Referring now to FIGS. 5 and 6, electric cooking plate member 21 has an upper surface and a lower surface and passageway 21a, 21b extends all the way from one surface to the other and is open on both ends thereof. The upper portion 21a of passageway 21a, 21b has a relatively small diameter and the lower portion 21b thereof has a relatively large diameter, thus forming a shoulder 21c between the two aforesaid portions. In a similar fashion the liquid filled receptacle 20 comprises a lower portion 20a of relatively wide diameter and an upper portion 20b of relatively small diameter forming a shoulder 20c therebetween. Portions 20a, 20b and portions 20b, 21a are substantially coextensive. In the position of the parts shown in FIG. 5 shoulder 21c is engaged by shoulder 20c, both forming cooperative abutments limiting the axial upward travel of receptacle 20 under the bias of helical spring 22. There is a predetermined radial clearance between the portion 21b of passageway 21a, 21b and portion 20a of liquid-filled receptacle 20. In a like fashion there is a radial clearance between the portion 21a of passageway 21a, 21b and portion 20b of liquid filled receptacle 20. The aforementioned clearance minimizes lateral heat exchange between plate 21 and receptacle 20. Receptacle 20 is maintained in spaced relation from passageway 21a, 21b by a pair of resilient disc-shaped or ring-shaped spacers 24a, 24b whose radially outer perimeters are fitted into circular grooves provided in the walls bounding passageway 21a, 21b. Spring or disc 24a is positioned in such a way as to close the upper end of passageway 21a, 21b, thus precluding particles of food to drop into passageway 21a, 21b where the presence of any kind of foreign matter is undesirable.

In the position of the constituent parts of the plate structure shown in FIG. 5 the upper end of receptacle 20 projects yieldingly slightly above the upper surface of part 21. If a liquid-filled cooking vessel 23 is placed upon part 21 the upper end of receptacle 20 is slightly depressed and shoulders 20c, 21 are moved out of abutting engagement. Now spring 22 presses the upper end of receptacle 20 into firm engagement with the bottom of liquid-filled cooking vessel 23, thus maximizing heat exchange between said bottom and the upper end of receptacle 20.

Referring now to FIG. 7a, numeral 31 has been applied to indicate an electric heating plate defining a passageway 31b extending from the lower surface to the upper surface of plate 31. The structure of FIG. 7a as well as the structure of FIGS. 5 and 6 are both predicated on the provision of spacer means for maintaining a predetermined clearance between the recess or passageway for receiving the liquid-filled receptacle and the latter which spacer means engage substantially linearily the lateral wall of the receptacle, on the one hand, and engage substantially linearily the portion of the plate member adjacent said recess. In the structure of FIGS. 5 and 6 these spacer means are formed by transverse resilient rings 24a, 24b and in the structure of FIG. 7a these spacer means are formed by longitudinal fins 30a. If desired the spaces between the several fins may be left empty. This makes it possible for foreign matter to enter these spaces yet, since such spaces may be open adjacent the upper surface of plate 31 as well as adjacent the lower surface thereof, such spaces can readily be cleaned by means of an appropriate tool as, for instance, a length of wire. The radially outer edges of spacer ribs or spacer fins 30a may engage a tubular lining 34 provided inside passageway 31b and made of an appropriate thermal insulating material as, for instance, glass fibers or asbestos fibers. The provision of such a lining is optional. Ribs or fins 30a have radial projections 30b at the lower ends thereof, i.e. the ends thereof adjacent the lower surface of plate member 31. Plate member 31 is provided at the lower surface thereof with a substantially cylindrical projection 31a whose lower surface forms an abutment engaged by projections 30b limiting the upward axial travel of receptacle 30 under the bias of helical spring 33. The latter is interposed between the lower end of receptacle 30 and the upper surface of a bracket 32 supported by the lower surface of plate member 31. It will be noted that bracket 32 does not in any way obstruct the longitudinal passages which are formed between thermal insulating lining 34, receptacle 30, and the spacer fins 30a thereof. Therefore spilled liquids are free to flow from the upper surface of plate member 31 through the aforementioned longitudinal passages to the lower surface of plate member 31.

If desired a thin metallic sleeve may be interposed between the radially outer ends of fins 30a and lining layer 34. On the other hand, fins 30a may be entirely omitted and the clearance left between receptacle 30 and passageway 31b plugged with a thermal insulating sleeve of appropriately increased thickness.

Referring now to FIG. 8 plate member 40 is provided at the lower surface thereof with a cylindrical projection or collar 40c, and recess or passageway 40a extends all the way through the plate member 40 proper as well as through the projection 40a thereof. The upper end of passageway 40a is enlarged in diameter or cross-sectional area as indicated at 40b. The portion of passageway 40a below the enlarged portion 40b thereof is lined with a thermal insulating material indicated at 41. The liquid-filled receptacle 42 has a lower relatively wide portion 42a and an upper portion whose diameter or cross-sectional area is substantially less than the inner diameter or cross-sectional area of passageway 40a as reduced by the presence of its insulating lining 41. This minimizes any direct heat exchange between plate member 40 and receptacle 42. The lower relatively wide portion 42a of receptacle 42 is adapted to engage the lower surface of collar 40c and thus to limit the upward travel of receptacle 42 under the bias of a helical compression spring arranged under receptacle 42. In the position of parts shown in FIG. 8 parts 40c and 42a are in cooperative or abutting engagement, and the upper travel of receptacle 42 is limited. The upper end of receptacle 42 supports a cap 43 which projects at 43a radially outwardly, i.e. beyond the outer diameter of the upper portion of receptacle 42. Cap 43 is made of a good thermal conductor such as a metal and its outer diameter is but slightly less than the inner diameter of the wide portion 40b of passageway 40a. The upper surface of cap 43 projects slightly above the surface of plate member 40 when in the position of the parts shown in FIG. 8. When a pot or other vessel is placed upon plate member 40 the upper surface of cap 43 is pressed downwardly into the plane defined by the upper surface of plate member 40. In that position the upper surface of cap 43 engages under pressure the bottom of any pot or other vessel placed thereon, and due to the relatively large area of the upper surface of cap 43 the heat exchange between the pot or other vessel and the liquid inside of receptacle 42 will be maximized. Cap 43 is provided on the lower side thereof with a sleeve surrounding the upper portion of receptacle 42 and contributing to the aforementioned heat exchange. Cap 43 forms also an effective labyrinth seal precluding particles of food and other foreign matter from entering passageway 40a. Cap 43 may be removably mounted on the upper end of receptacle 42 which makes it possible to readily clean the former.

Referring now to FIG. 9, this particular embodiment of the invention stresses minimizing of heat exchange between the plate member and the liquid-filled receptacle on the one hand, and maximizing of heat exchange between the bottom of a vessel placed on the plate member and the liquid inside the receptacle. The plate member 52 of FIG. 9 is provided with a recess or passageway 52b whose lower portion has a diameter which is slightly less than the diameter of the upper portion 52a thereof. A shoulder is formed at 52c between the aforementioned portions of passageway 52b. A washer 54 of thermal insulating material rests on shoulder 52c. In the structure of FIG. 9 the liquid-filled receptacle takes the shape of a relatively flat capsule 50 having a relatively large diameter, the latter being slightly less than the inner diameter of the wide portion 52a of passageway 52b. Capsule 50 is relatively thin, i.e. the thickness or height thereof is small in comparison to its diameter. The lower surface of liquid-filled capsule 50 is provided with a small ear or ring into which is hooked the upper end of helical tension spring 55. A bracket 56 similar to the brackets shown in other figures is affixed to the lower surface of plate member 52 and defines another ear or ring into which is hooked the lower end of tension spring 55. Thus spring 56 pulls capsule 50 in downward direction. Capsule 50 rests on a Belleville-type spring washer 53 with the outer perimeter in engagement with capsule 50, whereas the apex of spring washer 53 rests upon a relatively fixed point. The upper end of helical spring 55 hooked into capsule 50 projects through central perforations provided in spring washer 53 and in thermal insulating disc 52. Spring washer 53 exerts a force in upward direction upon capsule or receptacle 50, whereas the force of helical spring 55 tends to pull capsule or receptacle 50 in downward direction. In the position of parts shown in FIG. 9 both forces balance each other, and the upper surface of capsule 50 projects slightly above the plane defined by the upper surface of plate member 52. If a vessel is placed upon plate member 52 and capsule 50, the latter is pushed downwardly or depressed, and spring washer 53 further compressed and helical spring 55 allowed to further contract. The lower side of capsule 50 is provided with a tubular inlet and outlet for liquid contained in capsule 50. Capillary tube 50a forms a duct for admitting liquid to capsule 50 and for draining liquid from capsule 50. Capillary tube 50a is wound helically and some of the turns of capillary tube 50 are inserted between, or sandwiched between, turns of helical spring 55. This arrangement of parts imparts a high degree of resilience to the end of capillary tube 50a connected to capsule 50 and provides, in addition thereto, a firm resilient support for that end of capillary tube 50a.

Capsule 50 may be lifted out of recess 52a against the action of spring 55, unhooked from spring 55 and then removed from plate member 52 for purposes of cleaning or replacement.

Having disclosed a large number of preferred embodiments of our invention, it is desired that the same be not limited to the particular structures disclosed. It will be obvious to any person skilled in the art that many modifications and changes may be made without departing from the broad spirit and scope of the invention as defined in and by the following claims.

We claim as our invention:
1. An electric cooking appliance comprising:
a plate member adapted to be heated electrically and having an upper surface and a lower surface and defining a recess extending from said lower surface toward said upper surface;
a receptacle fitted into said recess;
a body of liquid within said receptacle;
means for maintaining said receptacle inside said recess including a bracket arranged underneath said receptacle for maintaining said receptacle in position inside said recess;
means pivotally supporting said bracket on the lower surface of said plate member; and
means thermally insulating the sides of said receptacle from the lateral boundary wall of said recess and firmly positioning said receptacle inside said recess.

2. An electric cooking appliance comprising:
a plate member adapted to be heated electrically and having an upper surface and a lower surface and defining a recess extending from said lower surface toward said upper surface;
a receptacle fitted into said recess so as to leave a predetermined clearance between the lateral boundary wall of said recess and the lateral wall of said receptacle;
spacer means for maintaining said clearance engaging substantially linearily said lateral wall of said receptacle and said lateral boundary wall of said recess;
a body of liquid within said receptacle;
a bracket arranged underneath said receptacle for maintaining said receptacle in position inside of said recess;
means pivotally supporting said bracket on the lower surface of said plate member;
and spring means adapted to impart a bias to said receptacle in a direction substantially longitudinally of said recess.

3. An electric cooking appliance comprising:
a plate member adapted to be heated electrically and having an upper surface and a lower surface and defining a recess extending from said lower surface toward said upper surface;
a receptacle fitted into said recess so as to leave a predetermined clearance between the lateral boundary wall of said recess and the lateral wall of said receptacle;

a body of thermal insulating material inside the gap formed by said clearance between said recess and said lateral wall of said receptacle and at least in part filling said gap;

a body of liquid within said receptacle;

a bracket arranged underneath said receptacle for maintaining said receptacle in position inside said recess;

means pivotally supporting said bracket on the lower surface of said plate member;

and spring means adapted to impart a bias to said receptacle in a direction substantially longitudinally of said recess.

4. An electric cooking appliance comprising:

a plate member adapted to be heated electrically and having an upper surface and a lower surface and defining a recess extending from said lower surface toward said upper surface;

a receptacle fitted into said recess so as to leave a predetermined clearance between the lateral boundary wall of said recess and the lateral wall of said receptacle;

a body of liquid within said receptacle;

a U-shaped bracket arranged underneath said receptacle and having flange portions and a web portion;

means pivotally supporting said flange portion of said bracket on the lower surface of said plate member;

and a compression spring interposed between said receptacle and said web portion of said bracket imparting a bias to said receptacle in a direction substantially longitudinally of said recess.

5. An electric cooking appliance as specified in claim 5 wherein said flange portions of said bracket are pivotally supported by a cylindrical collar projecting downwardly from said lower surface of said plate member and forming an integral part thereof.

6. An electric cooking appliance comprising:

a plate member adapted to be heated electrically and having an upper surface and a lower surface and defining a passageway extending from said lower surface to said upper surface and having an open end adjacent said upper surface and an open end adjacent said lower surface;

and an open end adjacent said lower surface;

a receptacle fitted into said passageway so as to leave a predetermined clearance between the lateral wall of said passageway and the lateral wall of said receptacle;

a body of liquid within said receptacle;

a bracket arranged underneath said receptacle for maintaining said receptacle in position inside said passageway;

means pivotally supporting said bracket on the lower surface of said plate member;

and spring means adapted to impart a bias to said receptacle in a direction substantially longitudinally of said passageway.

7. An electric cooking appliance comprising:

a plate member adapted to be heated electrically and having an upper surface and a lower surface and defining a passageway extending from said lower surface to said upper surface and having an open upper end and an open lower end;

a receptacle fitted into said passageway so as to leave a predetermined clearance between the lateral wall of said passageway and the lateral wall of said receptacle;

a body of liquid within said receptacle;

a bracket attached to said lower surface of said plate member arranged underneath said receptacle for maintaining said receptacle in position inside said passageway;

spring means adapted to impart a bias to said receptacle in a direction substantially longitudinally of said passageway and yieldingly moving the upper end of said receptacle through said open upper end of said passageway;

and abutment means limiting the distance said upper end of said receptacle is allowed to project under the action of said spring means through said open upper end of said passageway.

8. An electric cooking appliance comprising:

a plate member adapted to be heated electrically and having an upper surface and a lower surface and defining a passageway extending from said lower surface to said upper surface and having an open upper end and an open lower end, said passageway having a smaller cross-sectional area at said upper end than at said lower end thereof and forming a shoulder between said upper end and said lower end thereof;

a receptacle fitted into said passageway so as to leave a predetermined clearance between the lateral wall of said passageway and the lateral wall of said receptacle, said receptacle having a smaller cross-sectional area at the upper end thereof than at the lower end thereof and forming a shoulder between said upper end thereof and said lower end thereof;

a body of liquid within said receptacle;

and spring means adapted to impart a bias to said receptacle in a direction substantially longitudinally of said recess causing engagement of said shoulder of said passageway by said shoulder of said receptacle.

9. An electric cooking appliance comprising:

a plate member adapted to be heated electrically and having an upper surface and a lower surface and defining a passageway extending from said lower surface to said upper surface and having an upper open end and a lower open end, said passageway having a larger cross-sectional area adjacent said upper end than adjacent said lower end;

a receptacle fitted into said passageway so as to leave a predetermined clearance between the lateral wall of said passageway and the lateral wall of said receptacle, said receptacle having a sufficiently large cross-sectional area at the lower end thereof to preclude said receptacle from being moved all the way through said passageway, and said receptacle having a plate affixed at the upper end thereof substantially coextensive with said larger cross-sectional area of said passageway adjacent said upper end thereof;

a body of liquid within said receptacle;

a bracket attached to said lower surface of said plate member arranged underneath said lower open end of said passageway for maintaining said receptacle in position inside said passageway;

and spring means adapted to impart a bias to said receptacle in a direction substantially longitudinally of said passageway.

10. An electric cooking appliance comprising:

a plate member adapted to be heated electrically and having an upper surface and a lower surface and defining a passageway extending from said lower surface to said upper surface and having an open upper end and an open lower end;

a receptacle fitted into said passageway adjacent said open upper end thereof and substantially closing said open upper end except for a clearance left between the perimeter of said receptacle and the lateral boundary wall of said passageway, said receptacle having a predetermined height small in comparison to the width thereof;

a body of liquid within said receptacle;

a bracket attached to said lower surface of said plate member arranged underneath said lower open end of said passageway;

and helical spring means attached to said receptacle and to said bracket biasing said receptacle in a direction substantially longitudinally of said passageway.

11. An electric cooking appliance comprising:
a plate member adapted to be heated electrically and having an upper surface and a lower surface and defining a passageway extending from said lower surface to said upper surface and having an open upper end and an open lower end;
a receptacle having an upper surface and a lower surface, said receptacle being fitted into said passageway and substantially closing said open upper end thereof except for a clearance left between the perimeter of said receptacle and the lateral boundary wall of said passageway;
a body of liquid within said receptacle;
a first spring means within said passageway tending to move said receptacle in a downward direction;
a second spring within said passageway tending to push said receptacle in an upward direction; and
said first spring and said second spring being so balanced as to maintain said upper surface of said receptacle slightly above the level defined by said upper surface of said plate member.

12. An electric cooking appliance as specified in claim 11 wherein
said first spring is formed by a helical tension spring arranged within said passageway in coaxial relation thereto and wherein
said second spring is formed by a resilient disc arranged within said passageway in a transverse direction.

13. An electric cooking appliance comprising:
a plate member adapted to be heated electrically and having an upper surface and a lower surface and defining a passageway substantially at right angles to said upper surface and to said lower surface thereof;
a receptacle fitted into said passageway so as to leave a predetermined clearance between the lateral boundary wall of said passageway and the lateral wall of said receptacle;
a body of liquid within said receptacle;
a bracket attached to said lower surface of said plate member arranged underneath said receptacle;
helical spring means interposed between said receptacle and said bracket biasing said receptacle in a direction longitudinally of said passageway;
and a helical pipe connected to said receptacle arranged within said passageway in coaxial relation thereto and having windings interleaving with windings of said helical spring means.

References Cited in the file of this patent

UNITED STATES PATENTS

| | | |
|---|---|---|
| 2,303,012 | Weber et al. | Nov. 24, 1942 |
| 3,040,161 | Bremer et al. | June 19, 1962 |

FOREIGN PATENTS

| | | |
|---|---|---|
| 864,735 | Great Britain | Apr. 6, 1961 |
| 957,284 | France | Feb. 15, 1950 |

UNITED STATES PATENT OFFICE
CERTIFICATE OF CORRECTION

Patent No. 3,114,027                                December 10, 1963

Heinrich Busch et al.

It is hereby certified that error appears in the above numbered patent requiring correction and that the said Letters Patent should read as corrected below.

Column 7, line 25, for "portion" read -- portions --; line 43, strike out "and an open end adjacent said lower surface;"; column 9, line 14, strike out "means".

Signed and sealed this 2nd day of June 1964.

(SEAL)
Attest:

ERNEST W. SWIDER                                   EDWARD J. BRENNER
Attesting Officer                                      Commissioner of Patents